United States Patent
Copeland (10) Patent No.: US 7,574,181 B2
(45) Date of Patent: Aug. 11, 2009

(54) SYSTEM AND METHOD FOR PREPROCESSING A SIGNAL FOR TRANSMISSION BY A POWER AMPLIFIER

(75) Inventor: Gregory Clark Copeland, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 363 days.

(21) Appl. No.: 11/513,735

(22) Filed: Aug. 31, 2006

(65) Prior Publication Data
US 2008/0057880 A1   Mar. 6, 2008

(51) Int. Cl.
H04B 1/02 (2006.01)
(52) U.S. Cl. .................................. 455/103; 455/561
(58) Field of Classification Search .................. None
See application file for complete search history.

(56) References Cited

U.S. PATENT DOCUMENTS 5,163,181 A * 11/1992 Koontz ..................... 455/103
2004/0014500 A1 * 1/2004 Chun ........................ 455/561
2006/0116087 A1 * 6/2006 Sugar et al. ............... 455/103

* cited by examiner

Primary Examiner—Thanh C Le
(74) Attorney, Agent, or Firm—John J. Patti; Wade J. Brady, III; Frederick J. Telecky, Jr.

(57) ABSTRACT

System and method for preprocessing a signal for transmission by a power amplifier. In a preferred embodiment a multiple input multiple output processor is coupled to a plurality of power amplifiers for transmitting a signal, where the number of power amplifiers exceeds the number of antennas. The multiple input multiple output processor performs an algorithm to optimize the output vector ensuring that the transmit power for any one amplifier is below a predetermined threshold. In a preferred embodiment a Remez optimization algorithm is performed. Alternative optimization algorithms may be used. In a preferred embodiment the processor is a single integrated circuit. A method is disclosed where a multiple output vector is produced for transmission, using an optimization algorithm to produce an output vector that ensures that for any of the power amplifiers, the transmit power is maintained below a predetermined threshold.

20 Claims, 4 Drawing Sheets

SYSTEM AND METHOD FOR PREPROCESSING A SIGNAL FOR TRANSMISSION BY A POWER AMPLIFIER

TECHNICAL FIELD

The present invention relates generally to a system and method for increasing the performance of high power amplifiers when transmitting signals, and more particularly to a system and method for providing preprocessing of a signal prior to transmission by a power amplifier. The preprocessing may result in reducing the peak amplitude ratio in order to further linearize the response of a power amplifier for a communications system, as a non-limiting example the amplifier may be for use in a base station in a cellular telephone system.

BACKGROUND

Figure 1:
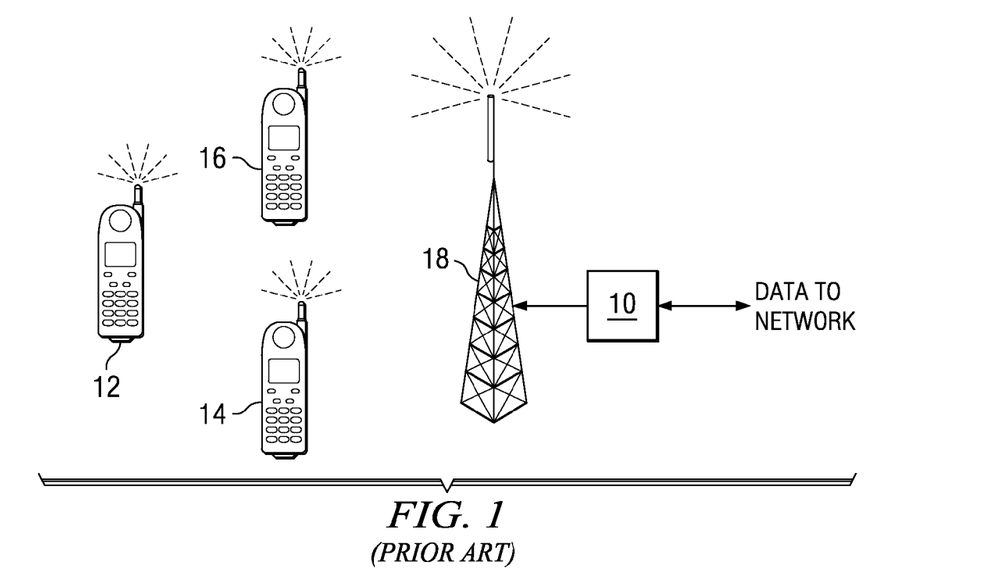
FIG. 1 illustrates a prior art cellular system.

An important application for high power amplifiers in the current art is in the area of wideband cellular communications (e.g., cell phones and cell systems including base stations in communication with the cell phones and providing connection to the telephony system). For example, a typical application for a high power amplifier is in implementing the transmitter function for a cellular telephone base station (of course, the base station receives as well, however the receiver functionality is not addressed here). FIG. 1 depicts a base station circuit 10 in an illustrative prior art cellular communications system. Base station circuit 10 is coupled to an antenna 18 for transceiving signals to a variety of communication units 12, 14 and 16. These communication units are depicted as handheld portable cellular telephones, although these are merely examples and many other devices are presently communicating over these systems. In a typical system the cell phones may communicate their availability to the base station that is nearest to the phone at a given time, or, that has the most capacity for adding additional communication channels, using well known industry standard defined signaling including registration, hand-off, and seeking techniques. If the cell phone moves from one location to another, various handoff and registration techniques are used to establish communication with the next nearest or most available cellular base station and antenna, as is known in the art. The cell phones can simultaneously send and receive communications including digitized voice and digital data to the base station circuit 10 using, for example, wideband spread spectrum signaling over the air via the antenna 18. This is accomplished using several well known standard protocols for voice and/or data transmission, for example CDMA, WCDMA, TDMA, GSM, EDGE, 3G and the like.

Although the example in FIG. 1 depicts the units 12, 14, 16 as portable cell phones, it is known to incorporate many other features that require substantial data bandwidth. Examples now implemented, or planned in the near future, include video streams, audio streams, email, data file transfer, text messaging, instant messaging, mobile internet access and mobile television viewing, mobile payment systems, all applications included in certain advanced or announced cell phones. These applications will continue to require increasing amounts of data to be transmitted over the cellular system. Further, the communications units may be devices other than cell phones, including wireless portable email terminals, computers both fixed and portable such as laptops and palm computers, fixed location, handheld and vehicle mounted telephone equipment, personal internet browsing devices, even video equipment and other communications or data receiver or transmitter applications. The base station circuitry 50 provides a link between the conventional wired telephone network (not shown), which may include switches, copper and fiber optical cables and equipment, and repeaters, concentrators and routers as is known in the telephony art, to the cellular system.

Figure 2:
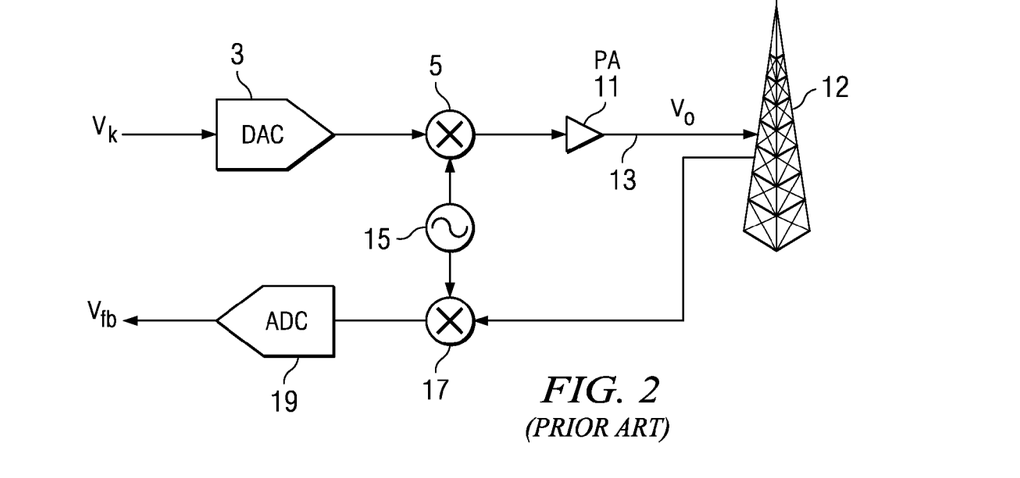
FIG. 2 depicts a prior art transmit function incorporating a power amplifier and an antenna such as are used in a system exemplified by FIG. 1.

FIG. 2 depicts a simplified schematic of the RF transmit portion for such a base station application. (Only a single RF transmit function and one antenna is shown, however, many may be used). In FIG. 2, digital baseband transmit data $V_k$ is input to a digital to analog converter (DAC) 3, which outputs analog data for transmission to a frequency converter 5, clocked by a local oscillator 15, the frequency converted analog signal is next presented to a power amplifier 11, and the resulting analog amplified output signal $V_o$ is presented to an antenna 12 by a coupler 13 for transmission. (In this example schematic, a single amplifier and a single antenna are shown, but in a practical commercial system many amplifiers and many antennas may be coupled in parallel at a single location). A feedback path then returns an observed version of the transmitted signal $V_o$ for observation. This is accomplished, for example, by coupling the antenna to a second frequency converter 17 which is likewise clocked by local oscillator 15, the frequency converted analog signal is then processed by analog-to-digital converter 19 and digital signals $V_{fb}$ are made available for observation, and for use in compensation of the transmit signal using conventional feedback techniques.

Generally, high power amplifiers as are used in the communication art exhibit non-linear output characteristics, particularly as the transmit power level is increased. This non-linear behavior results in distortion in the output signal that is undesirable, and may cause the communications system to fail to meet the required performance metrics as set by standards organizations, or the governing regulatory agencies. However, as is well known, any power transistor driving a load will act in a nonlinear fashion when operating in the transistor saturation region, that is, the linear relationship of the voltage input-voltage output characteristic is only maintained in the linear operation region of the transistor. As the input signal power is increased to and beyond the saturation point of the driving transistors in the power amplifier, the response of the transistor(s) does not change linearly and the power output characteristic therefore inherently becomes non-linear.

A simple and somewhat effective prior art approach to limiting non-linear power amplifier distortion for base station transmitters is to simply "back off" the output power, so that the power amplifier operates only within the linear part of its voltage response characteristic. However, to be effective this output power "back off" must be sufficient to account for the peak-to-average ratio (PAR) of the input signal, and the required transmit power back off to maintain linear performance of the driving transistors over the entire range of input signal conditions may therefore become very significant. This increased back off results in very low amplifier efficiencies. As an example, a CDMA signal of the present cell phone systems may exhibit a PAR of up to 13 dB. Power back off is a well known source of inefficiency in the operation of the high power amplifier in a transmitter, because the amplifier is being intentionally operated at far lower than possible output power levels, for a given supply power. This inefficiency results in additional power consumption during operation of the system and therefore increases the manufacturing costs of the system, because to achieve a certain output power requires that a much more powerful amplifier be used, while if the back off were not required, a lower power amplifier can be used, and lower costs for the amplifier would therefore accrue. This inefficiency causes increased operating or ownership costs for the system, as the operating power expended for the actual transmit power achieved is increased.

A characteristic of modern communications systems is the use of linear signal modulation such as quadrature phase shift keying (QPSK), quadrature amplitude modulation (QAM) and multicarrier configurations. Signals for transmission currently combine multiple signal channels and exhibit a fluctuating signal envelope of combined RF carriers that are to be transmitted at a single transmitter. These characteristics increase demand on the performance of the power amplifier over the earlier analog cellular and PCS cellular systems, which had multiple power amplifiers driving a signal combiner and antenna. In the current systems, intermodulation distortion (IMD) occurs and due to the adjacent channel leakage introduces adjacent channel interference (ACI) in the adjacent channel receivers. These added pulses/signals introduce distortion, which reduces the overall system performance and the bit error rate. However, the degradation that results are overcome with the additional transmit power that is possible. A highly linear power amplifier is required to transmit acceptable quality signals in these systems. The governing standards for various systems may specify minimum performance criteria, one of which may be expressed, for example, as a required Adjacent Channel Leakage Ratio (ACLR). For a current WCDMA standard base station, the 3G standard specification requires an ACLR performance of 45 dB in the adjacent channel. This metric is a measure of the transmit power detected in a non-used channel when there is transmission in an adjacent channel. The more linear the components in the power amplifier used for the system are, the better the ACLR performance will be, and also the more efficient the operation of the power amplifier may be, with reduced need for backoff.

The term "crest factor" is sometimes used in the art for describing the significance of the peak amplitude verses the average amplitude of a particular signal. One prior art approach to reducing the amount of "back off" required to maintain the amplifier in its linear operating range is to modify the input signal prior to applying it to the power amplifier for transmission. This signal modification is accomplished by applying a technique called "crest factor reduction" or "CFR". CFR changes the input signal prior to presentation to the high power amplifier by removing the "crests" in the input signal. In one known approach a cancellation signal is applied. As large amplitude peaks over a defined threshold are identified in the input signal, a compensating signal with an opposing crest is created and then this inverted signal is combined with the input signal so as to cancel only the largest peaks in the input signal, and so reduce the crest factor, i.e. reduce the PAR, prior to presenting the signal to the power amplifier for transmission. This approach advantageously reduces the amount of "back off" required to maintain the power amplifier in its linear range, and efficiency for the system is thus increased.

Commercial processors are available that are specifically designed to provide the CFR function, for example Texas Instruments, Inc. supplies integrated circuits designated as part no. GC1115 particularly directed to implementing CFR in cellular communications systems. The GC1115 is a crest factor reduction preprocessor that receives digital upconverted input signals as I (in phase) and Q (quadrature phase) form digital signals, for example, and outputs a modified I, Q, signal with the peaks removed for transmission with reduced PAR. The GC1115 integrated circuit is operated by programmable DSP executing software provided by the user.

Figure 3:
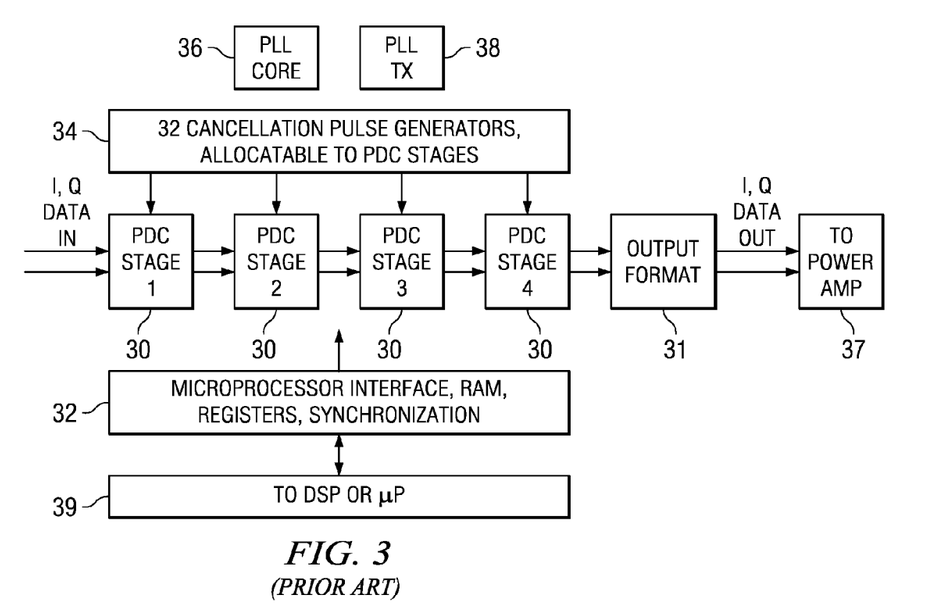
FIG. 3 is a schematic of a prior art CFR processor which implements peak amplitude reduction.

FIG. 3 depicts a simplified block diagram of some of the functional blocks of the prior art GC1115 processor. There are, coupled in series cascade fashion, four individual peak detection and cancellation (PDC) blocks 30. Each one of these PDC blocks is coupled to a group selectably provided from the thirty-two included pulse cancellation generators in block 34. Phase lock loop circuits PLL CORE 36 and PLL TX 38 are provided to provide timing signals. The block labeled MICROPROCESSOR INTERFACE 39 includes control registers, storage RAM, synchronizers and other supporting circuitry required to enable a user programmable device, such as a DSP, ARM, RISC or general purpose microprocessor, to control the GC1115 according to user defined programmation. The block labeled 37 receives the I, Q output data from the CFR processor and includes the many functions that typically follow as shown, for example in FIG. 2. In operation, the GC1115 PDC blocks 30 are used to detect and cancel peaks in the input signal, which is input in the form of I and Q phase sampled digital signals or vectors. The cancellation peak generators in block 34 are used in conjunction with PDC stages to remove the peaks. Typically, coarse peaks are removed at the first stage, and finer and finer peak cancellation is performed by each subsequent pipelined stage, until the peaks are removed to achieve a desired PAR reduction.

Figure 4:
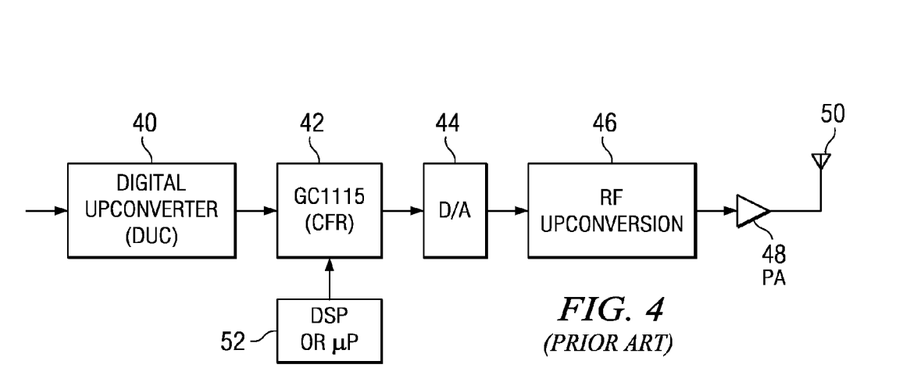
FIG. 4 is a block diagram illustration of prior art transmit system including the CFR of FIG. 3.

FIG. 4 depicts the use of the CFR GC1115 processor in an exemplary prior art system for transmitting baseband signals. In FIG. 4, signals are provided to the cellular station for transmission and are input to a digital upconverter DUC 40. CFR processor 42 receives the upconverter output and provides corresponding output signals with the reduced peaks desired, for improving amplifier efficiency in the power amplifier stage without the need for excessive back off. Digital to analog conversion is performed in D/A converter 44 and the analog signals are upconverted to an appropriate radio frequency by the function RF upconverter 46. Power amplifier 48 receives the signals and transmits them via the antenna 50. DSP or microprocessor 52 controls the operation of the CFR processor 42.

While the approaches of the prior art can maintain the high power amplifier in a more linear operating range by reducing the crest factors of the input signal, these approaches require a modification of the input signal and thus distort the signal somewhat as a necessary consequence.

Thus, there is a continuing and increasing need in the art for a system and method that provides efficient adaptive linearization of the power amplifier through crest factor reduction alone or in combination with improved predistortion functions. The system should be realizable using commercially available technology, and compatible with and useful in conjunction with power amplifier implementations that include, or alternatively that do not include, digital predistortion circuitry to further enhance the performance of the power amplifier. Embodiments and methods of the present invention address this need.

SUMMARY OF THE INVENTION

These and other problems are generally solved or circumvented, and technical advantages are generally achieved, by preferred embodiments and methods of the present invention which implements signal preprocessing and/or crest factor reduction circuitry including a multiple input multiple output (hereinafter "MIMO") preprocessor circuit, the output is a signal with reduced peak-to-average ratio ("PAR"), the system incorporating the invention provides a modified digital signal with reduced crest factor that is presented to a plurality of power amplifiers for transmission. Because the MIMO characteristics of the system incorporating the invention provide added degrees of freedom, it is possible to remove the peaks from the individual amplified signals without distorting the transmitted signal, an advantage over the crest factor reduction approaches of the prior art. The effect of the invention is to optimize the output signal for a system with multiple antennas and power amplifiers, without distorting the transmitted signal, in order to enable efficient operation of the power amplifiers with reduced need for amplifier back off.

In accordance with a preferred embodiment of the present invention, a system and method for linearizing a high power amplifier (sometimes "HPA") by reduction of the peak to average ratio of an input signal for a transmit function is to provide a multiple input, multiple output (MIMO) configurable preprocessor between the digital input signal vector and the power amplifier, for reducing the crest factor in the input signals prior to transmission. The method reduces the crest factor with no appreciable loss in signal quality. The system and method of the invention incorporates a MIMO amplifier crest factor reduction approach. When the number of power amplifiers in the base station system to be optimized exceeds the number of antennas coupled to the amplifiers, it has been discovered that beneficial advantage can be taken of the redundancies in order to improve the performance of the system.

Preferably, the system and method of the invention implements a signal conditioning function to prepare a signal for input to a high power amplifier, the conditioning might include crest factor reduction. The system and methods of the invention are characterized by the form of producing outputs at a plurality of antennas, or loads, and additional outputs at one or more dummy antennas, or dummy loads. An algorithm is performed which attempts to optimize an output vector for presentation to a plurality of amplifiers for transmission. The output vector that is to be transmitted at the output of the real antennas is made equal or nearly equal to the input vector, while at the same time, conditioning the input signals of each of a plurality of high power amplifiers to constrain the input signal for each amplifier when the input signal would otherwise cause the power in the amplifier to exceed a peak threshold. The overall solution is considered optimized when the transmit output at the dummy loads is minimized for a given set of parameters that constrain the input signal to the power amplifiers (reduces crest factor), as dictated by one or more user or predefined peak power thresholds that are not to be exceeded for any individual power amplifier in the system.

Another preferred embodiment of the invention determines when the signal being transmitted is a low power signal, and in this situation the method of the invention may result in fewer of the amplifiers being used to transmit the signal, thus reducing the power consumed for low input signal power situations.

Alternative preferred embodiments which use different approaches to the implementation of the optimizer solution that is part of the invention may be implemented, including without limitation: standard least squares approximation, the Remez algorithm, DCT or DFT transforms, Simplex methods, and other known approaches may be applied to implement the optimization of the vector signals in order to meet the constraints while reproducing the input signal at the output antennas.

In accordance with another preferred embodiment of the present invention, a system for linearizing a power amplifier comprises first performing the CFR method using a preferred embodiment of the system described above and then performing additional linearization using an improved digital predistortion system.

An advantage of a preferred embodiment of the present invention is that the functions are broken into pieces that operate on individual data points in an independent fashion, such that real time execution of the crest factor reduction, adaptive filtering, digital predistortion, and combining functions is possible using existing semiconductor integrated circuits for real time execution of the algorithms.

A further advantage of a preferred embodiment of the present invention is that it may be combined with additional known signal conditioning approaches such as Farrow filtering, digital up conversion, digital modulation, and other known approaches, to further reduce the PAR or otherwise condition the input signal prior to the digital predistortion circuitry. Other advantages and benefits will be described in the detailed description that follows.

The MIMO preprocessor, in one embodiment, may be implemented as an integrated circuit using custom, semi-custom. ASIC, gate array or other known approaches. Alternatively the processor can be segmented across multiple ICs. The processor may be architected to have a DSP or microprocessor interface to control the CFR processing functions, alternatively the DSP can be integrated with the MIMO preprocessor in a single integrated circuit. Other arrangements for implementing the circuitry and the algorithms of the invention using both programmable and dedicated hardware and integrated circuit technology will be obvious to those skilled in the art, and these alternatives are part of the invention and fall within the scope of the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a transmitter including a power amplifier for use, for example but not limiting the scope of the invention, in a basestation in a cellular communications system that is an RF transmitter. The invention may also be applied, however, to other power amplifiers where linearizing the input-output transfer characteristic by the preprocessing a signal for transmission, for example by the use of crest factor reduction, is desirable.

Figure 5:
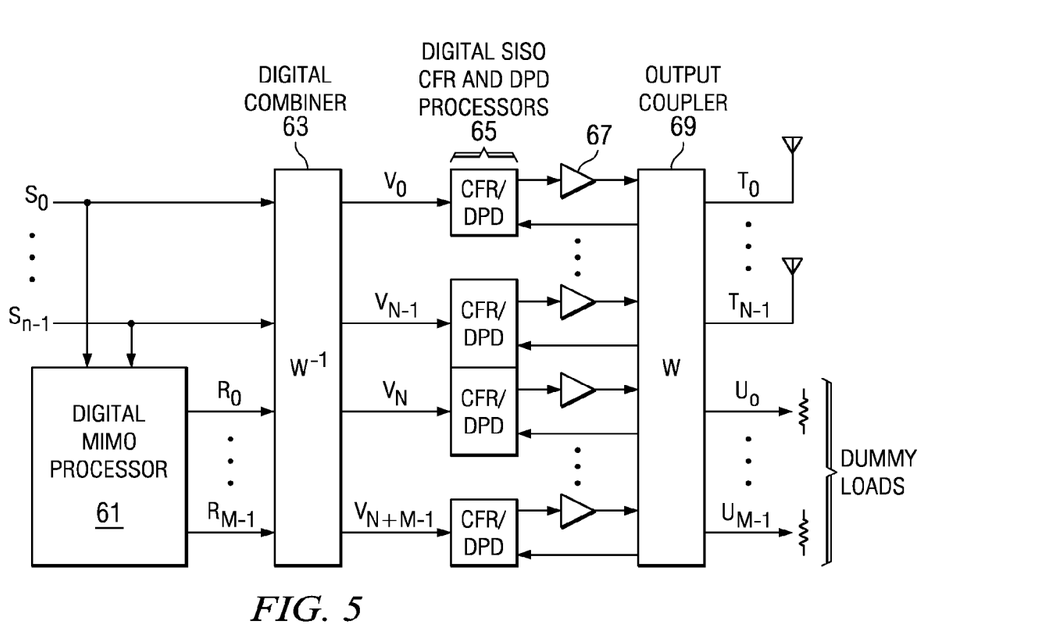
FIG. 5 is a simplified block diagram of an exemplary embodiment of a system incorporating the novel approaches of the present invention.

With reference now to FIG. 5, illustrated is a simple explanatory case of a preferred embodiment of the invention. In the block diagram of FIG. 5, digital baseband data S of dimension N is input to a digital signal MIMO preprocessor 61. The baseband data S and the generated vector R of dimension M are processed with digital combiner 63. This portion of the system of FIG. 7 constitutes the MIMO section of the preprocessor. Optionally each output of the digital combiner 63 can be processed with a conventional 1 input 1 output CFR processor 65 (in an alternative preferred embodiment, these are omitted). These processors 65 then output signals to the digital to analog conversion process. In the analog path, which is not fully depicted in the example illustrated in FIG. 7 for simplicity, are digital to analog converters, filtering, RF upconversion and power amplifiers. The outputs of the amplifiers drive a RF coupler circuit 69, which transmits signals T of dimension N to antennas, and signals U of dimension M to dummy loads. The coupler is ideally a lossless device and the inputs are combined in a manner so as to achieve this requirement. The digital combiner 63 and the analog RF coupler 69 are ideally exact inverses of each other. Therefore in the absence of clipping in the digital (Single input, Single output) SISO CFR blocks 65, output Tn=Sn. Put another way, the combined system is lossless in the sense the antenna outputs T are exactly the same as the base band input S input to the MIMO subsystem.

The approach illustrated in the embodiment of FIG. 5 leverages the fact that in a multidimensional signal, the total signal power is much more constrained with larger dimensions if the powers of each component dimensions are the same. For the analysis that follows, the signal is approximated as a multi-dimensional band limited Gaussian of constant variance, and zero mean. It is further assumed that the matrix S corresponds to a lossless coupler with N input and N output ports that are lossless (that is, power in equals power out) and reciprocal. For a network to be lossless and reciprocal the following must be true:

1) $W*W^H=I$
2) $W=W^H$ (symmetric)

Without loss in generality W can be expressed as a discrete fourier transform (DFT) matrix $s_{ij}=\exp(2*p*i*j/N)/\sqrt{N}$. This scattering matrix satisfies the above requirements. It is believed that this scattering matrix choice does not limit any system performance capabilities in this approach. This network is commonly referred to as a Butler coupler.

The matrix representation is commonly given (usually called the S parameters of the device) as:

$$[T;U]=W*V$$

Where
V is the amplifiers output and the couplers input
W is the coupler S parameters (from the input ports to output ports only (reflection parameters are ignored here
T is the coupler outputs to the antennas
U is the coupler outputs to the dummy loads Clearly the MIMO processor R is arbitrary if the objective is to output T so that it is equal to S when no single input single output (SISO) CFR processing is done. Optionally the SISO CFR blocks may be followed by a SISO digital predistortion (DPD) block to minimize the amplifier nonlinearity. The added degree of freedom that results may therefore be exploited for a secondary purpose, in preferred embodiments, in systems incorporating the invention; the added degree of freedom may be exploited to reduce the crest factor of the input signal S without distortion.

With the MIMO subsystem, it is preferred to drive the amplifiers with the power while maintaining the input below some peak signal level that is determined to be below the amplifier saturation level. At low signal levels, all of the power is transferred to the antenna port T; the coupler is lossless so none of the power is delivered to the dummy loads. In this situation then, the system of FIG. 5 performs exactly as an amplifier of the prior art built of smaller amplifier modules operated in parallel, as is known. This arrangement is sometimes used to accommodate larger power levels to the antenna than can be provided by a single amplifier. In a preferred embodiment, this arrangement further allows selected amplifiers to be turned off during low input power periods, for a more efficient implementation over a wider range of power levels. Also inherent in this preferred embodiment is a natural redundancy scheme where if one amplifier or multiple amplifiers fails, by appropriately preprocessing the data, the input to the affected amplifier(s) is zeroed while maintaining the T=S relationship by providing the correct R vector to accomplish the objectives. Providing this preprocess data is relatively simple using the input to output linear relationships. Additionally if the required power to be delivered to the antennas is low, amplifiers may be turned off to conserve power during these lower power demand periods.

In another situation, if the peak power output of the subsystem of FIG. 5 were somewhat lower than the combined power of the amplifiers but high enough so that setting R=0 overloads individual amplifiers on signal peaks, the crest factor (PAR) of each amplifier may be reduced by supplying a nonzero R vector from the MIMO processor 61. The computation of this desired R vector is the domain of the MIMO processor shown in FIG. 5.

One system optimization criterion may be simply stated as:

$$\min_R \max_i \|V_i\|$$

A somewhat more difficult to implement, but better approach, would be to select an R vector of minimum norm, that provides $|V_i|<=\alpha$. This alternative approach will minimize the total RF power generated and dissipated by the dummy loads while keeping the maximum HPA power below the allowable peak. In other words:

$$\min_R \|R\| \text{ subject to } |V_i| \le \alpha \text{ for all } i$$

If $|V_i|<=\alpha$ with R=0, then the MIMO processor introduces no additional signal R. In this case no additional processing is required, as it is known none of the amplifiers coupled to transmit V will enter saturation while transmitting the signal. Only in the case where $|V_i|>\alpha$ does the MIMO processor have to compute an augmentation vector R. This optimization can be performed on a sample-by-sample basis. In the event where the above optimization approach cannot accomplish the goal of keeping all $|V_i|<=\alpha$, the MIMO processor then simply minimizes max $|V_i|$ and relies on the SISO CFR processors to then reduce the final peak level into the amplifiers below the specified maximum. This alternative process however will introduce distortion into the desired outputs Ti, but the system distortion will still be lower than the distortion that would be required using the SISO CFR processors only.

In one preferred embodiment a Remez algorithm is used to implement the optimization algorithm. Many optimization solution algorithms are known that may also be used. Alternative preferred embodiments which use different approaches to the implementation of the optimizer solution that is part of the invention include without limitation: standard least squares approximation, the Remez algorithm described above, DCT or DFT transforms, simplex methods, conjugate gradient, Fibonacci and Golden Mean methods, Secant method, Newton method, nonlinear programming, stochastic search, genetic algorithms and other known approaches. These optimization algorithms may be applied to implement the optimization of the vector signals required to meet the constraints while reproducing the input signal at the output antennas. Preferably, a programmable DSP is coupled to the MIMO processor and may be programmed through user developed software to implement a variety of algorithms, such that the best optimization algorithm for a given system and environment can be selected.

It has been empirically found that if the number of amplifiers is approximately twice the number of antennas; the crest factor can be typically reduced by 2-3 dB if the number of antennas is greater than one. Since the MIMO CFR technique of the preferred embodiments of the invention does not add distortion to the subsystem outputs to the antennas, a significant gain in the overall performance of the RF power amplifiers can be realized.

In one preferred embodiment the MIMO block of the present invention can be fabricated as a single integrated circuit. This integrated circuit can be produced using custom, semi-custom, or ASIC design styles; alternatively a programmable gate array such as an FPGA or other rapid design device could be used. Alternatively, a programmable processor could be programmed to perform the functions of the MIMO processor. Discrete circuitry could be used to provide part of the functionality of the MIMO block of the invention. As described herein, the MIMO processor would typically interface to a DSP or microprocessor, and operate under its control; however in an alternative integrated solution the DSP or microprocessor could be incorporated into the same integrated circuit, for example using ASIC DSP cores as is known in the art.

Figure 6:
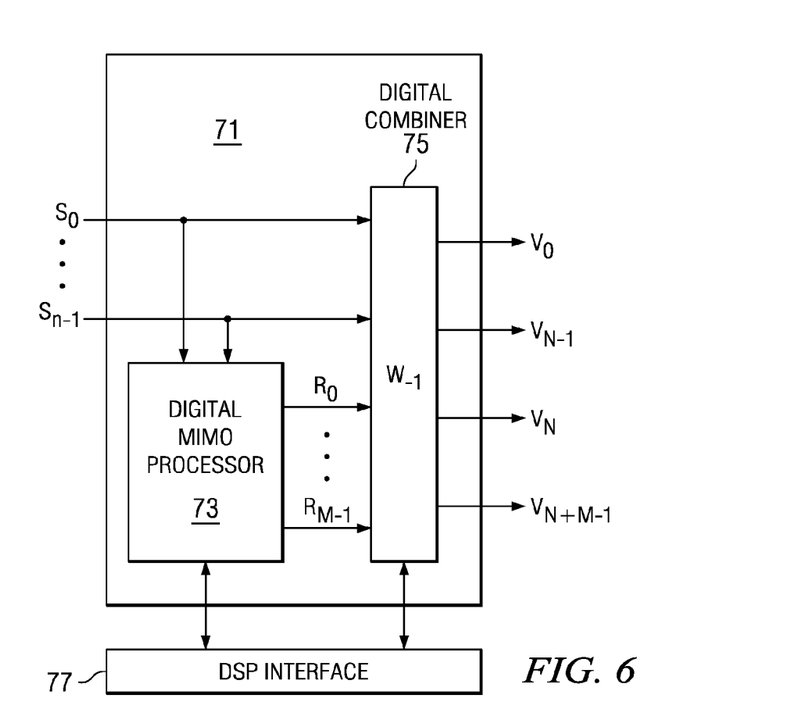
FIG. 6 is a block diagram illustration of an integrated circuit implementing the functions of one preferred embodiment of the present invention.

FIG. 6 depicts one possible integrated circuit implementation that combines the MIMO functions with the digital combiner on a single circuit 71. Inputs S are received into the digital combiner 75 and the MIMO function 73; each of which is controlled, for example, by a programmable DSP that is coupled by the DSP interface 77. The circuit outputs the digital signals V for further processing by the optional SISO CFR/DPD circuits and the analog processing functions as are known in the art. In this manner the preprocessing functions can be provided in a single integrated circuit. Alternatives include integrating additional functions with the digital combiner and the MIMO circuit, or, providing each circuit as a separate integrated circuit.

Figure 7:
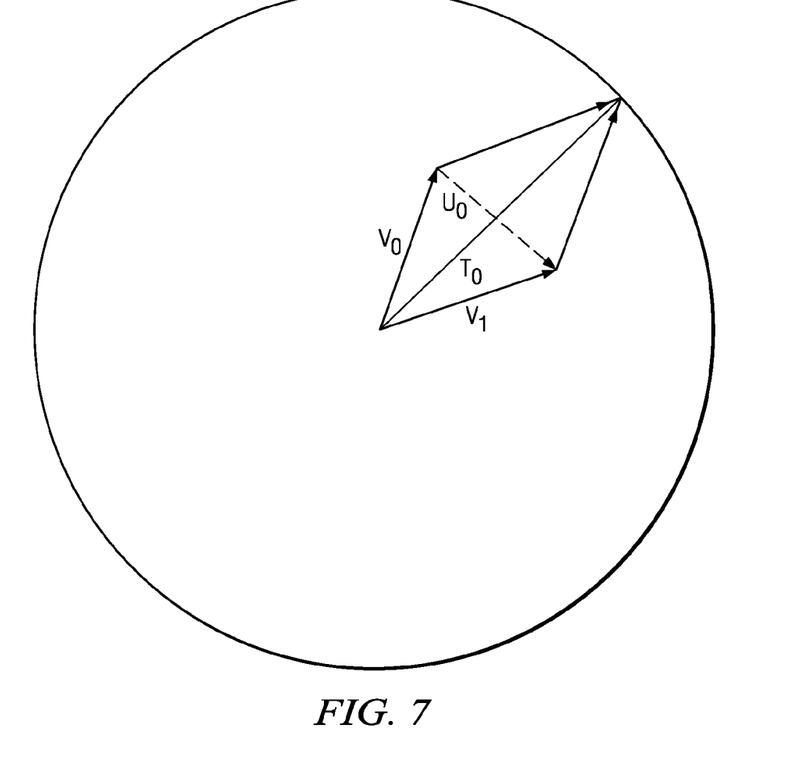
FIG. 7 is a graphical representation of the vectors for a particular case of a signal transmitted by an exemplary embodiment incorporating the present invention.

To help in understanding the MIMO solution approach of the preferred embodiments of the present invention from a vector point of view, a simple vector illustration if the transformation W is provided in FIG. 7. In FIG. 7, a vector view of a two-amplifier system $V_0$, $V_1$ is depicted. The linear path from input to output for a single amplifier is represented by the straight line $T_0$ from the center point to the outer diameter of the circle; the distance represents the magnitude of $T_0$. The MIMO approach of the invention is depicted as vectors $V_0$ and $V_1$, representing two power amplifiers. By splitting the transmitted signal into two vectors and optimizing as described above, the output can be maintained at the same point while the added degrees of freedom of having the multiple input multiple output approach allow the individual amplifier inputs $V_0$ and $V_1$ to be provided, so that the signals remain below a threshold that would otherwise place one of the amplifiers in saturation. The solution is the vector sum of $V_0+V_1$, the difference between them is shown as a cross hatched difference vector $U_0$ in FIG. 7. This solution can be advantageously accomplished without the need to distort the signal and thus provide a linear output with no distortion. In a practical system as described above, many amplifiers are used and some drive the dummy loads, in order to achieve the enhanced degrees of freedom needed to optimize the solution for any given input signal.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the optimization approach, for example, may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for preprocessing a signal for transmission by power amplifiers, comprising:
    providing in parallel a plurality of signal vector inputs;
    providing a multiple input multiple output processor for receiving the signal vector inputs, and for transmitting multiple outputs as a vector output;
    providing a plurality of power amplifiers for transmitting the multiple outputs;
    providing a plurality of antennas coupled to the plurality of power amplifiers through a lossless coupler, the plurality of antennas being fewer in number than the plurality of power amplifiers so that some subset of the power amplifiers drive dummy antennas;
    operating the multiple input multiple output processor to provide to the individual power amplifiers output signals for transmission; and
    transmitting output signals of the individual power amplifiers at the plurality of antennas.

2. The method of claim 1, and further comprising:
    operating the power amplifiers where for an input signal having signal power below a threshold, one or more of the power amplifiers is shut off.

3. The method of claim 1, and further comprising:
    operating the multiple input multiple output processor to implement an optimization algorithm, the algorithm minimizing power to the dummy antennas while ensuring the signal transmitted by any one of the power amplifiers will not exceed a predetermined threshold.

4. The method of claim 3, wherein the optimization algorithm is a Remez algorithm.

5. The method of claim 3, wherein the optimization algorithm is one selected from the group of DCT transforms, DFT transforms, simplex, conjugate gradient, Fibonacci, Golden Mean method, Secant method, Newton method, nonlinear programming, stochastic search, and genetic algorithms.

6. The method of claim 1, and further comprising:
providing a digital signal processor coupled to the multiple input multiple processor.

7. The method of claim 6 wherein the steps of operating the multiple input multiple output processor further comprise programming the digital signal processor.

8. The method of claim 6 wherein the predetermined constraint is calculated by the digital signal processor.

9. The method of claim 1, wherein the step of providing a multiple input multiple output processor comprises providing a digital integrated circuit implementing the processor.

10. The method of claim 6 and further comprising:
providing a digital signal processor coupled to the multiple input multiple output processor and programmably controlling the multiple input multiple output processor.

11. The method of claim 3 and further operating the multiple input multiple output processor to provide output signals for transmission to the power amplifiers to perform crest factor reduction.

12. A system for transmitting signals at a radio frequency, comprising:
a multiple input multiple output processor coupled to receive a multiple input signal vector and outputting a multiple signal output vector;
a plurality of antennas for transmitting radio frequency signals; and
a plurality of power amplifiers having inputs coupled to the multiple signal output vector and coupled to transmit signals to the power antennas through a lossless coupler, the number of power amplifiers being greater than the number of power antennas, and that subset of the plurality of power amplifiers exceeding the number of power antennas being coupled to dummy antennas;
wherein the multiple input multiple output processor operates to produce an output vector that reproduces the input signal vector, and further the output is transmitted by the plurality of power amplifiers to the plurality of antennas.

13. The system of claim 12 and further comprising:
a digital signal processor coupled to the multiple input multiple output processor for programmably operating the multiple input multiple output processor.

14. The system of claim 12 wherein the multiple input multiple output processor is an integrated circuit.

15. The system of claim 12 wherein the multiple input multiple output processor implements an optimization algorithm.

16. The system of claim 15, wherein the optimization algorithm is one selected from the group of Remez, DCT transforms, DFT transforms, simplex, conjugate gradient, Fibonacci, Golden Mean method, Secant method, Newton method, nonlinear programming, stochastic search, and genetic algorithms.

17. The system of claim 12 wherein the multiple input multiple output processor optimizes the output vector to maximize the power transmitted while ensuring each of the power amplifiers coupled to a power antenna has a transmit power that does not exceed the predetermined constraint and to minimize the transmit power that the power amplifiers coupled to the dummy antennas transmit.

18. An integrated circuit for reducing the peak amplitude ratio of a vector signal, comprising:
an input for receiving digital base band signals with a dimension N;
a multiple input multiple output processor coupled to the digital base band signals and outputting digital outputs R with a dimension M;
a digital combiner coupled the digital base band signals and the digital outputs and outputting signals V with a dimension of N+M;
an output for transmitting the signals V for further processing; and
an interface for coupling a digital signal processor to the multiple input multiple output processor and the digital combiner and for optimizing the signals V so that if a signal V would otherwise exceed a predetermined threshold, the signal energies are modified to maintain all of the signals V below the threshold such that the signals V may each be amplified by a power amplifier without distortion.

19. The integrated circuit of claim 18, and further comprising:
a single input single output crest factor reduction function coupled to each of the signals V between the digital combiner and the output for transmitting, the single input single output crest factor reduction functions providing additional signal processing.

20. The integrated circuit of claim 18 wherein the integrated circuit is implemented as an ASIC.

* * * * *